United States Patent [19]

Kai

[11] 4,343,027

[45] Aug. 3, 1982

[54] COMMON SUSPENSION MULTI-LINE GROUNDING PROTECTIVE RELAY

[75] Inventor: Takaaki Kai, Zushi, Japan

[73] Assignee: Kabushiki Kaisha Meidensha, Japan

[21] Appl. No.: 152,760

[22] Filed: May 23, 1980

[30] Foreign Application Priority Data

May 29, 1979 [JP] Japan ................................... 54/67184

[51] Int. Cl.³ ............................................. H02H 3/16
[52] U.S. Cl. ......................................... 361/42; 324/52
[58] Field of Search ............................ 361/42, 47, 48; 364/492; 324/52

[56] References Cited

U.S. PATENT DOCUMENTS 3,984,737 10/1976 Okamura et al. ............... 364/492 X

OTHER PUBLICATIONS

"Protective Relaying for Systems Bearing Zero--Phase-Sequence Circulating Current" Suzuki et al. 1972.
"Digital Processors for Substation Switching and Control"-Horne et al., 1975 Conference Developments in Power System Protection 11-13 Mar. 1975 London England pp. 237-243.

*Primary Examiner*—Harry E. Moose, Jr.
*Attorney, Agent, or Firm*—McGlew and Tuttle

[57] ABSTRACT

The present invention discloses a grounding protective relay which compensates for zero phase circulation current between lines and zero phase vertical voltage drops generated by induction in a common suspension multiline system. The grounding protective relay comprises, substantially, a current detector which detects the inter-line differential currents, a filter which eliminates the positive phase component from the inter-line differential current of each pair of phases, calculating sections calculate the zero phase component, the ratio of the magnitudes and the phase difference, an grounded phase detector, and a selection section which selects, according to the phase which is grounded, a deriveration result from a calculating section, characterized in that, when a grounded fault occurs, the zero phase circulation current is selected and is compensated.

19 Claims, 10 Drawing Figures

COMMON SUSPENSION MULTI-LINE GROUNDING PROTECTIVE RELAY

BACKGROUND OF THE INVENTION

The present invention relates to a protective device for a power supply system, and particularly to a grounding protective relay which compensates for zero phase circulation current between lines and zero phase vertical voltage drops generated by induction in a common suspension multi-line system in which a common suspension multi-line high resistance grounding system (including a Peterzen Coil grounding system) has a T-branch load between two parallel lines.

In electrical transmission systems with very high voltage transmission lines and common suspension high resistance grounding systems, because the very high voltage transmission lines are arranged in non-crossover suspension, and reverse phase distribution, the flow of current in the very high voltage transmission line induces zero phase circulation currents between lines (henceforth referred to simply as zero phase circulation currents) and zero phase vertical voltage drops, and for this reason the grounding protective relay operates erroneously or fails erroneously to operate. Because of this, it is necessary to compensate for zero phase circulation currents and zero phase vertical voltage drops.

The present invention is a result of considering the above mentioned points, and it is the object of the present invention to provide a grounding protective relay which makes the influence of zero phase circulation currents and zero phase vertical voltage drops as small as possible, with the capability of accurately detecting grounding fault.

SUMMARY OF THE INVENTION

Briefly, the present invention is characterized as follows:

(1) A common suspension multi-line grounding protective relay, comprising: a current detector which detects the inter-line differential current in at least three phases of a high resistance grounding system (including Peterzen Coil system) having two parallel power transmission circuits; a filter which inputs the inter-line differential current between each two phases of the power transmission circuit, which have been output by the current detector, and eliminates from the inter-line differential current of each pair of phases the positive phase component; a first calculating section which calculates the zero phase component from the inter-line differential currents detected by the aforesaid current detector, and then calculates the ratio of the magnitudes and the phase difference between this zero phase component and the output of the aforesaid filter; a second calculating section which, from the ratio of the magnitudes and phase difference derived by the aforesaid first calculating section, corrects the outputs of the filter; grounded phase detector which carries out detection of the phase which is grounded; and a first section which selects, according to the phase which is grounded, a derivation result from the second calculating section, characterised in that, when a ground fault occurs, the zero phase circulation current is selected from the aforesaid second calculating section by the first selection section, and is compensated.

(2) A common suspension multi-line grounding protective relay, comprising: a first voltage detector detecting the zero phase voltage of the transmission line; a third calculating section which calculates the zero phase component from the zero phase voltage detected by the first voltage detector and the inter-line differential current detected by the current detector of item (1) above, and further calculates the ratio of the magnitudes and the phase difference of the zero phase voltage and the zero phase component of the inter-line differential current; and a fourth calculating section, which, from the ratio of magnitudes and phase difference derived in the aforesaid third calculating section, according to the method of item (1) above, compensates the derived zero phase circulation current, characterised in that, when a grounding fault occurs in the transmission line, the zero phase vertical voltage is derived from the aforesaid fourth calculating section, and is compensated.

(3) A common suspension multi-line earthing protective relay, comprising: the second calculating section of item (1) above, and a first decision section which compares quantities derived from the second calculating section, and characterised in that a grounding accident of the power transmission line is detected by the first decision section.

(4) A common suspension multi-line earthing protective relay, comprising: a voltage detector which detects voltage $\dot{E}_a$, $\dot{E}_b$, and $\dot{E}_c$ of phases a, b, and c of the transmission lines; and a third decision section, which inputs the voltages of phases a, b, and c, and determines which of the following relations (1), (2), (3) holds:

$$I(I\dot{E}_b+\dot{E}_c I-I\dot{E}_a I) I>e \qquad (1)$$

$$I(I\dot{E}_a+\dot{E}_c I-I\dot{E}_b I) II>e \qquad (2)$$

$$I(I\dot{E}_b+\dot{E}_a I-II\dot{E}_c I) I>e \qquad (3)$$

(e=constant; I I represents absolute value.) characterised in that an earthed phase of the transmission lines is detected in the third decision section.

BRIEF DESCRIPTION OF THE DRAWINGS

The invention will now be further explained and one particular relay arrangement in accordance with the present invention will be described, by way of an example, with reference to the accompanying drawings in which.

MULTI-LINE SYSTEM CHARACTERISTICS

Figure 1A:
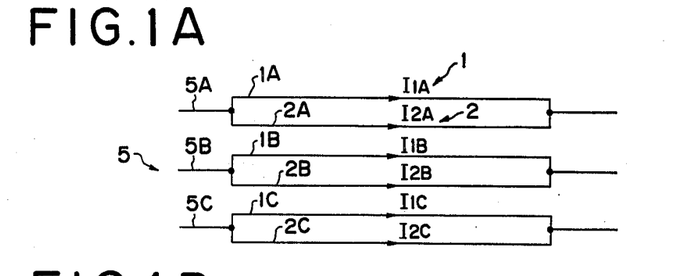
FIGS. 1(A) to 1(C) show an idealized common suspension multi-line system.
Figure 1B:
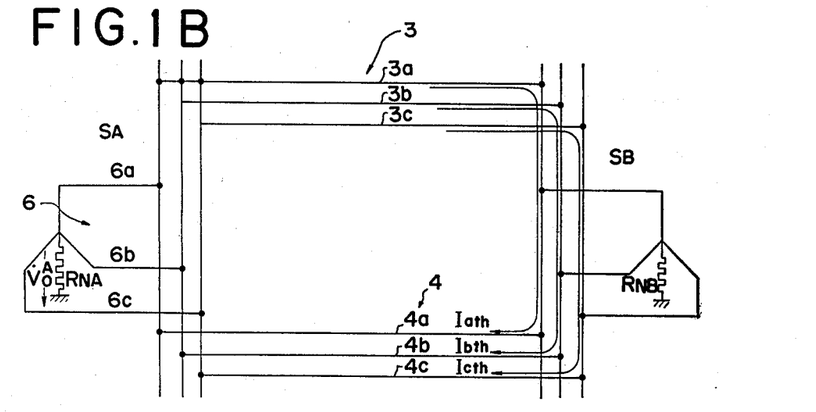
Figure 1C:
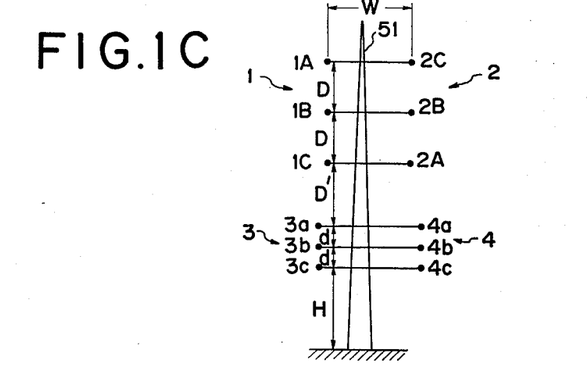

FIGS. 1(A) to 1(C) show an idealized common suspension multi line system to which the present invention has been applied. In FIG. 1(A), 1A, 1B, 1C, 2A, 2B and, 2C are 187 KV to 500 KV very high voltage transmission lines (henceforth referred to as the inducting system), and 5A, 5B, and 5C are buses for the very high voltage transmission lines whose phases are indicated by A, B and C respectively. A first circuit 1 comprises the lines 1A, 1B and 1C, and a second circuit 2 comprises the lines 2A, 2B and 2C. $\dot{I}_{1A}$, $\dot{I}_{1B}$, and $\dot{I}_{1C}$ indicate the currents of A, B, and C phases. In FIG. 1(B), 3a, 3b, 3c, 4a, 4b, and 4c are 66 KV to 154 KV high resistance earthing system transmission lines (henceforth referred to as the inducted system), and 6a, 6b, and 6c are buses for the phases a, b, and c respectively of the high resistance grounding system transmission lines. A third circuit 3 comprises the lines 3a, 3b and 3c, and a fourth circuit comprises the lines 4a, 4b, and 4c. $\dot{I}_{ath}$, $\dot{I}_{bth}$, and $\dot{I}_{cth}$ are the circulation currents in phases A, B, and C respectively, flowing from the third circuit 3 to the fourth circuit 4 because of the induction of the induction system in FIG. 1(A). $\dot{V}_o{}^A$ is in the same way the zero phase vertical voltage drop generated at power station $S_A$ by induction.

The power station on the side of the bus 6 of the inducted circuit is termed $S_A$, and that on the opposite side is termed $S_B$. The neutral points of $S_A$ and $S_B$ are each connected to ground through neutral point grounding resistances $R_{NA}$, $R_{NB}$.

FIG. 1(C) shows how the inducting and inducted systems of FIGS. 1(A) and 1(B) may be supported together by a single steel tower 51. The lines 1A to 1C and 2A to 2C of the inducting system are in reverse phase distribution, and the lines 3a to 3c and 4a to 4c of the inducted system are in inphase distribution, W, D, D', d, and H show the distribution of the lines; for example W=8 m, D=8 m, D'=8.5 m, d=3 m, and H=20 m.

The currents flowing in phases A, B, and C of the circuits 1 and 2 will be called $\dot{I}_{1A}$, $\dot{I}_{1B}$, $\dot{I}_{1C}$, $\dot{I}_{2A}$, $\dot{I}_{2B}$, and $\dot{I}_{2C}$. Letting the electromagnetic induction voltages induced in each phase in the circuits 3 and 4 by the currents in the circuits 1 and 2 be $\dot{V}_{3ma}$, $\dot{V}_{3mb}$, $\dot{V}_{3mc}$, $\dot{V}_{4ma}$, $\dot{V}_{4mb}$, and $\dot{V}_{4mc}$, we have:

$$(\dot{V}_{3m}) = -jwlm(L_{31})(\dot{I}_1) - jwlm(L_{32})(\dot{I}_2) \tag{1}$$

$$(\dot{V}_{4m}) = -jwlm(L_{41})(\dot{I}_1) - jwlm(L_{42})(\dot{I}_2) \tag{2}$$

Here lm is the common supported length in kilometers of the inducting and inducted systems, w is the angular frequency of the system, and ( ) is used to represent a matrix.

$$(\dot{V}_{3m}) = \begin{bmatrix} (\dot{V}_{3ma}) \\ (\dot{V}_{3mb}) \\ (\dot{V}_{3mc}) \end{bmatrix} \quad (\dot{V}_{4m}) = \begin{bmatrix} (\dot{V}_{4ma}) \\ (\dot{V}_{4mb}) \\ (\dot{V}_{4mc}) \end{bmatrix} \tag{3}$$

$$(\dot{I}_1) = \begin{bmatrix} (\dot{I}_{1A}) \\ (\dot{I}_{1B}) \\ (\dot{I}_{1C}) \end{bmatrix} \quad (\dot{I}_2) = \begin{bmatrix} (\dot{I}_{2A}) \\ (\dot{I}_{2B}) \\ (\dot{I}_{2C}) \end{bmatrix} \tag{4}$$

($L_{31}$) mutual inductance of the circuits 3 and 1;

($L_{32}$) mutual inductance of the circuits 3 and 2;

($L_{41}$) mutual inductance of the circuits 4 and 1;

($L_{42}$) mutual inductance of the circuits 4 and 2.

$$(L_{31}) = \begin{bmatrix} (M_{3a,1A} M_{3a,1B} M_{3a,1C}) \\ (M_{3b,1A} M_{3b,1B} M_{3b,1C}) \\ (M_{3c,1A} M_{3c,1B} M_{3c,1C}) \end{bmatrix} \tag{4}$$

$$(L_{32}) = \begin{bmatrix} (M_{3a,2A} M_{3a,2B} M_{3a,2C}) \\ (M_{3b,2A} M_{3b,2B} M_{3b,2C}) \\ (M_{3c,2A} M_{3c,2B} M_{3c,2C}) \end{bmatrix}$$

$$(L_{41}) = \begin{bmatrix} (M_{4a,1A} M_{4a,1B} M_{4a,1C}) \\ (M_{4b,1A} M_{4b,1B} M_{4b,1C}) \\ (M_{4c,1A} M_{4c,1B} M_{4c,1C}) \end{bmatrix} \tag{5}$$

$$(L_{42}) = \begin{bmatrix} (M_{4a,2A} M_{4a,2B} M_{4a,2C}) \\ (M_{4b,2A} M_{4b,2B} M_{4b,2C}) \\ (M_{4c,2A} M_{4c,2B} M_{4c,2c}) \end{bmatrix}$$

in equation (5) ($M_{3a,1A}$) is the mutual inductance between conductors 3a and 1A.

$$M_{3a,1A} = 0.05 + 0.4605 \log_{10} \frac{2He}{D_{3a,1A}} \text{ (mH/km)} \tag{6}$$

$D_{3a,1A}$: distance (m) between the conductors 3a and 1A;
He: equivalent ground surface depth (m).

Letting the currents in phases a, b, and c of the circuits 3 and 4 be $\dot{I}_{3a}$, $\dot{I}_{3b}$, $\dot{I}_{3c}$, $\dot{I}_{4a}$, $\dot{I}_{4b}$, $\dot{I}_{4c}$, and ignoring the resistance of the line and the resistance of the earth, the equations of the voltage of the inducted system are:

$$jwlm(L_{33})(\dot{I}_3) + \tag{7}$$

$$jwlm(L_{34})(\dot{I}_4) + (R_{NA} + R_{NB})1((\dot{I}_3) + (\dot{I}_4)) = (\dot{V}_{3m})$$

$$jwlm(L_{44})(\dot{I}_4) + \tag{8}$$

$$jwlm(L_{43})(\dot{I}_3) + (R_{NA} + R_{NB})1((\dot{I}_3) + (\dot{I}_4)) = (\dot{V}_{4m})$$

Here:

$$(\dot{I}_3) = \begin{bmatrix} (\dot{I}_{3a}) \\ (\dot{I}_{3b}) \\ (\dot{I}_{3c}) \end{bmatrix} \quad (\dot{I}_4) = \begin{bmatrix} (\dot{I}_{4a}) \\ (\dot{I}_{4b}) \\ (\dot{I}_{4c}) \end{bmatrix} \quad 1 = \begin{bmatrix} 1 & 1 & 1 \\ 1 & 1 & 1 \\ 1 & 1 & 1 \end{bmatrix} \tag{9}$$

($L_{33}$)=self and mutual inductance of circuit 3.
($L_{34}$)=mutual inductance of the circuits 3 and 4.
($L_{44}$)=self and mutual inductance of circuit 4.
($L_{43}$)=mutual inductance of 4 and 3.

$$(L_{33}) = \begin{bmatrix} (M_{3a,3a} M_{3a,3b} M_{3a,3c}) \\ (M_{3b,3a} M_{3b,3b} M_{3b,3c}) \\ (M_{3c,3a} M_{3c,3b} M_{3c,3c}) \end{bmatrix} \quad (L_{34}) = \begin{bmatrix} (M_{3a,4a} M_{3a,4b} M_{3a,4c}) \\ (M_{3b,4a} M_{3b,4b} M_{3b,4c}) \\ (M_{3c,4a} M_{3c,4b} M_{3c,4c}) \end{bmatrix} \tag{10}$$

$$(L_{44}) = \begin{bmatrix} (M_{4a,4a} M_{4a,4b} M_{4a,4c}) \\ (M_{4b,4a} M_{4b,4b} M_{4b,4c}) \\ (M_{4c,4a} M_{4c,4b} M_{4c,4c}) \end{bmatrix} \quad (L_{43}) = \begin{bmatrix} (M_{4a,3a} M_{4a,3b} M_{4a,3c}) \\ (M_{4b,3a} M_{4b,3b} M_{4b,3c}) \\ (M_{4c,3a} M_{4c,3b} M_{4c,3c}) \end{bmatrix}$$

$M_{3a,3a}$=self inductance of conductor 3a.

$$M_{3a,3a} = M_{4a,4a}$$

$$= 0.10 + 0.4605 \log_{10} \frac{2He}{r} \text{ (mH/km)}$$

$r$ = radius ($m$) of conductor.

Because the circuits 3 and 4 are symmetrical to right and left:

$$(L_{33}) = (L_{44}) \quad (11)$$

$$(L_{34}) = (L_{44}) \quad (12)$$

Substituting (11) and (12) into (7) and (8), (7) and (8) become:

$$jwlm((L_{33})-(L_{34}))((\dot{I}_3)-(\dot{I}_4))= -((\dot{V}_{3m})-(\dot{V}_{4m})) \quad (13)$$

and thus:

$$(\dot{I}_3)-(\dot{I}_4) = -1/jwlm$$
$$((L_{33})-(L_{34}))^{-1} \cdot ((\dot{V}_{3m})-(\dot{V}_{4m})) \quad (14)$$

From (14), the currents $\dot{I}_{ath}$ and $\dot{I}_{bth}$, $\dot{I}_{cth}$ of phases a, b and c in 3 and 4 of the inducted system caused by electromagnetic induction from the inducting system, are given by:

$$\begin{bmatrix} (\dot{I}_{ath}) \\ (\dot{I}_{bth}) \\ (\dot{I}_{cth}) \end{bmatrix} = \quad (15)$$

$$\tfrac{1}{2}((\dot{I}_3) - (\dot{I}_4)) = -\frac{1}{2jwim}((L_{33})-(L_{34}))^{-1}((\dot{V}_{3m})-(\dot{V}_{4m}))$$

If we assume that the currents flowing in the inductance system are in equilibrium, $$(\dot{I}_1) = \begin{bmatrix} \dot{I}_1 \\ a^2 \dot{I}_1 \\ a\dot{I}_1 \end{bmatrix} \approx \begin{bmatrix} 1 \\ a^2 \\ a \end{bmatrix} \dot{I}_1 \quad (\dot{I}_2) = \begin{bmatrix} \dot{I}_2 \\ a^2 \dot{I}_2 \\ a\dot{I}_2 \end{bmatrix} = \begin{bmatrix} 1 \\ a^2 \\ a \end{bmatrix} \dot{I}_2 \quad (16)$$

where $a = e^{j\frac{2}{3}\pi}$, $a^2 = e^{-j\frac{2}{3}\pi}$

Substituting equation (16) into equations (1) and (2), equations (1) and (2) become:

$$(\dot{V}_{3m}) - (\dot{V}_{4m}) = -jwlm(((L_{31}) - (L_{41})) \begin{bmatrix} 1 \\ a^2 \\ a \end{bmatrix} \dot{I}_1 \quad (17)$$

$$+ ((L_{32}) - (L_{42})) \begin{bmatrix} 1 \\ a^2 \\ a \end{bmatrix} (\dot{I}_2)$$

substituting equation (17) into equation (15):

$$\begin{matrix}(\dot{I}_{ath}) \\ (\dot{I}_{bth}) \\ (\dot{I}_{cth}) \end{matrix} = \tfrac{1}{2}((L_{33})-(L_{34}))^{-1}((L_{31})-(L_{41})) \begin{bmatrix} 1 \\ a^2 \\ a \end{bmatrix} \dot{I} \quad (18)$$

$$+ ((L_{32}) - (L_{42})) \begin{bmatrix} 1 \\ a^2 \\ a \end{bmatrix} (\dot{I}_2)$$

whence putting:

$$\frac{A_1}{1} = \tfrac{1}{2}((L_{33}) - (L_{34}))^{-1}(((L_{31}) - (L_{41})) \cdot \begin{bmatrix} 1 \\ a^2 \\ a \end{bmatrix} \quad (19)$$

$$A_2 = \tfrac{1}{2}((L_{33}) - (L_{34}))^{-1}(((L_{32}) - (L_{42})) \cdot \begin{bmatrix} 1 \\ a^2 \\ a \end{bmatrix}$$

we get:

$$\dot{I}_{ath} = (1, 0, 0) A_1 \dot{I}_1 + (1, 0, 0) A_2 \dot{I}_2 \quad (20)$$
$$\dot{I}_{bth} = (0, 1, 0) A_1 \dot{I}_1 + (0, 1, 0) A_2 \dot{I}_2 \quad (21)$$
$$\dot{I}_{cth} = (0, 0, 1) A_1 \dot{I}_1 + (0, 0, 1) A_2 \dot{I}_2 \quad (22)$$

As will be seen from equations (20), (21), and (22), $\dot{I}_{ath}$, $\dot{I}_{bth}$, $\dot{I}_{cth}$ are proportional to the currents of 1 and 2 of the inducting system, and this coefficient of proportionality is given by the following when the inducting system is operating:

$$I_{ath} = K_a I \quad (23)$$

$$I_{bth} = K_b I \quad (24)$$

$$I_{cth} = K_c I \quad (25)$$

When both circuits 1 and 2 of the inducting system are operating, setting $\dot{I}_1 = \dot{I}_2 = \dot{I}$, and substituting into equations (20) to (22):

$$\left.\begin{matrix} \dot{K}_a = ((1, 0, 0)A_1 + (1, 0, 0)A_2) \\ \dot{K}_b = ((0, 1, 0)A_1 + (0, 1, 0)A_2) \\ \dot{K}_c = ((0, 0, 1)A_1 + (0, 0, 1)A_2) \end{matrix}\right\} \quad (26)$$

When only 1 of the inducting system is operating, setting $\dot{I}_1 = \dot{I}$ and $\dot{I}_2 = 0$, and substituting into equations (20) to (22):

$$\left.\begin{matrix} \dot{K}_a = ((1, 0, 0)A_1 \\ \dot{K}_b = ((0, 1, 0)A_1 \\ \dot{K}_c = ((0, 0, 1)A_1 \end{matrix}\right\} \quad (27)$$

When only circuit 2 of the inducting system is operating, setting $I_1 = 0$ and $I_2 = I$, and substituting into equations (20) to (22):

$$\left.\begin{matrix} \dot{K}_a = (1, 0, 0)A_2 \\ \dot{K}_b = (0, 1, 0)A_2 \\ \dot{K}_c = (0, 0, 1)A_2 \end{matrix}\right\} \quad (28)$$

As will be seen from equations (26) to (28), the constants of proportionality $\dot{K}_a$, $\dot{K}_b$, and $\dot{K}_c$ of $\dot{I}_{ath}$, $\dot{I}_{bth}$, and $\dot{I}_{cth}$ and the currents of $\dot{I}$ of the inducting system, are determined by the distribution of the conductors and the operating state of the inducting system.

Again, from equation (18), the zero phase component of $\dot{I}_{ath}$, $\dot{I}_{bth}$, and $\dot{I}_{cth}$, in other words, the zero phase circulation current $\dot{I}_{oth}$ is given by:

$$\begin{aligned}\dot{I}_{oth} &= \dot{I}_{ath} + \dot{I}_{bth} + \dot{I}_{cth} \\ &= \tfrac{1}{2}(1, 1, 1)((L_{33}) - (L_{34}))^{-1}(((L_{31}) - (L_{41})))\end{aligned} \quad (29)$$

$$\begin{bmatrix} 1 \\ a^2 \\ a \end{bmatrix} \dot{I}_1 + (((L_{32}) - (L_{42}))) \begin{bmatrix} 1 \\ a^2 \\ a \end{bmatrix} \dot{I}$$

As will be seen from equation (29), $\dot{I}_{oth}$ is proportional to the currents of the circuits 1 and 2 of the inducting system, and the constant of proportionality is given as follows, when the inducting system is in the operating state:

$$\dot{I}_{oth} = \dot{K} I \qquad (30)$$

With this representation, when both circuits 1 and 2 of the inducting system are operating, setting $\dot{I}_1 = \dot{I}_2 = \dot{I}$, and substituting into equation (29), $$\dot{K} = \tfrac{1}{3}(1, 1, 1)((L_{33}) - (L_{34}))^{-1}(((L_{31}) - (L_{41}) + \qquad (31)$$

$$((L_{32}) - (L_{42}))) \begin{bmatrix} 1 \\ a^2 \\ a \end{bmatrix}$$

When 1 only is operating:

$$\dot{K} = \tfrac{1}{3}(1, 1, 1)((L_{33}) - (L_{34}))^{-1}((L_{31}) - (L_{41})) \begin{bmatrix} 1 \\ a^2 \\ a \end{bmatrix} \qquad (32)$$

When circuit 2 only is operating:

$$\dot{K} = \tfrac{1}{3}(1, 1, 1)((L_{33}) - (L_{34}))^{-1}((L_{32}) - (L_{42})) \begin{bmatrix} 1 \\ a^2 \\ a \end{bmatrix} \qquad (33)$$

As will be seen from equations (30) to (33), the constant of proportionality $\dot{K}$ of $\dot{I}_{oth}$ and the current $\dot{I}$ of the inducting system, is determined by the conductor distribution and the operating state of the inducting system.

Substituting equations (11) and (12) into equations (7) and (8):

$$(jwlm((L_{33}) + (L_{34})) + 2(R_{NA} + R_{NB})E) \cdot ((\dot{I}_3) + (\dot{I}_4)) = \qquad (34)$$

$$-(\dot{V}_{3m}) - (\dot{V}_{4m})$$

Substituting equation (16) into equations (1) and (2):

$$-(\dot{V}_{3m}) - (\dot{V}_{4m}) = jwlm(((L_{31}) + (L_{41})) \begin{bmatrix} 1 \\ a^2 \\ a \end{bmatrix} \dot{I}_1 + \qquad (35)$$

$$((L_{32}) + (L_{42})) \begin{bmatrix} 1 \\ a^2 \\ a \end{bmatrix} \dot{I}_2)$$

Substituting equation (34) into equation (35), $(\dot{I}_3) + (\dot{I}_4)$ is given by:

$$(\dot{I}_3) + (\dot{I}_4) = (jwlm((L_{33}) + (L_{34})) + 2(R_{NA} + R_{NB})E)^{-1} \cdot \qquad (36)$$

$$jwlm(((L_{31}) + (L_{41})) \begin{bmatrix} 1 \\ a^2 \\ a \end{bmatrix} \dot{I}_1 + ((L_{32}) + (L_{42})) \begin{bmatrix} 1 \\ a^2 \\ a \end{bmatrix} \dot{I}_2)$$

$(\dot{I}_3) + (\dot{I}_4)$ is the current circulated in the inducted system and the earth by the electromagnetic induction of the inducting system, and this zero phase component, or in other words the inter-earth zero phase vertical circulation current $\dot{I}^g_{oth}$ is given by:

$$\dot{I}^g_{oth} = (1, 1, 1)(jwlm((L_{33}) + (L_{34})) + 2(R_{NA} + R_{NB})E)^{-1} \cdot \qquad (37)$$

$$jwlm(((L_{31}) + (L_{41})) \begin{bmatrix} 1 \\ a^2 \\ a \end{bmatrix} \dot{I}_1 + ((L_{32}) + (L_{42})) \begin{bmatrix} 1 \\ a^2 \\ a \end{bmatrix} \dot{I}_2)$$

This line to earth zero phase circulation current $\dot{I}^g_{oth}$ flows through the neutral point earthing resistances $R_{NA}$ and $R_{NB}$ of the power stations $S_A$ and $S_B$, and the zero phase vertical voltages $\dot{V}^A_0$ and $\dot{V}^B_0$ generated at power stations $S_A$ and $S_B$, are given by:

$$\dot{V}^A_0 = -3F_{NA} \dot{I}^g_{oth} = \qquad (38)$$

$$-3R_{NA}(1, 1, 1)(jwlm((L_{33}) + (L_{34}) + 2(R_{NA} + R_{NB})E)^{-1} \cdot$$

$$jwlm(((L_{31}) + (L_{41})) \begin{bmatrix} 1 \\ a^2 \\ a \end{bmatrix} \dot{I}_1 + ((L_{32}) + (L_{42})) \begin{bmatrix} 1 \\ a^2 \\ a \end{bmatrix} \dot{I}_2)$$

$$\dot{V}^B_0 = 3R_{NB} \dot{I}^g_{oth} = \qquad (39)$$

$$3R_{NA}(1, 1, 1)(jwlm((L_{33}) + (L_{34})) + 2(R_{NA} + R_{NB})E)^{-1}$$

$$jwlm(((L_{31}) + (L_{41})) \begin{bmatrix} 1 \\ a^2 \\ a \end{bmatrix} \dot{I}_1 + ((L_{32}) + (L_{42})) \begin{bmatrix} 1 \\ a^2 \\ a \end{bmatrix} \dot{I}_2)$$

Here $\dot{V}^A_0$ and $\dot{V}^B_0$ are relative to earth potential. Eliminating $\dot{I}_1$ and $\dot{I}_2$ from equations (29) and (38), we get the following.

When both circuits 1 and 2 of the inducting system are operating, setting $I_1 = I_2$: $\qquad (40)$ $$\dot{V}^A_0 = \dot{K}^A_0 \dot{I}_{oth}$$

where:

$$\dot{K}^A_0 = \frac{-6R_{NA}(1, 1, 1)(jwlm((L_{33})+(L_{34}))+2(R_{NA}+R_{NB})E)^{-1}}{(1, 1, 1)((L_{33})-(L_{34}))^{-1}} *$$

$$* \frac{jwlm((L_{31}) + (L_{41}) + (L_{32}) + (L_{42})) \begin{bmatrix} 1 \\ a^2 \\ a \end{bmatrix}}{((L_{31}) - (L_{41}) + (L_{32}) - (L_{42})) \begin{bmatrix} 1 \\ a^2 \\ a \end{bmatrix}}$$

when only circuit 1 of the inducting system is operating setting $\dot{I}_2 = 0$:

$$\dot{V}_0 = \dot{K}^A_0 \dot{I}_{oth} \qquad (41)$$

Where:

$$\dot{K}^A_0 = \frac{-6R_{NA}(1, 1, 1)(jwlm((L_{33})+(L_{34}))+2(R_{NA}+R_{NB})E)^{-1}}{(1, 1, 1)((L_{33})-(L_{34}))^{-1}} *$$

-continued $$* \frac{jwlm((L_{31}) + (L_{41})) \begin{bmatrix} 1 \\ a^2 \\ a \end{bmatrix}}{((L_{31}) - (L_{41})) \begin{bmatrix} 1 \\ a^2 \\ a \end{bmatrix}}$$

when only circuit 2 of the inducting system is operating:

$$\dot{V}_0^A = \dot{K}_0^A \dot{I}_{oth} \tag{42}$$

where:

$$\dot{K}_0^A \frac{-6R_{NA}(1, 1, 1))(jwlm((L_{33})+(L_{34}))+2(R_{NA}+R_{NB})E)^{-1}}{(1, 1, 1)((L_{33})-(L_{34}))^{-1}} *$$

$$* \frac{jwlm((L_{32}) + (L_{42})) \begin{bmatrix} 1 \\ a^2 \\ a \end{bmatrix}}{((L_{32}) - (L_{42})) \begin{bmatrix} 1 \\ a^2 \end{bmatrix}}$$

As will be seen from equations (40) to (42), $\dot{V}^A_0$ and $\dot{I}_{oth}$ are proportional, and the constant of proportionality K is determined by the distribution of the conductors and the operating state of the inducting system. The same can be said of $V^B_0$. When the inducted system is normal, $\dot{V}_0$, $V^B_0$, $\dot{I}_{oth}$, and $\dot{I}_{oth}$ are generated irrespective of failures, and by these, an erroneous operations or erroneous non-operations of a grounding protective relay can occur, and thus it is necessary to compensate for this. From the foregoing, the following facts have been established:

(1) the zero phase interline circulation currents $\dot{I}_{ath}$, $\dot{I}_{bth}$, and $\dot{I}_{cth}$ of phases a, b, and c are proportional to the flow in the inducting system. Proved by equations (23) to (28).

(2) the interline zero phase circulation current $\dot{I}_{oth}$ and the flow in the inducting system are proportional. Proved by equations (29) to (33).

(3) the zero phase vertical voltages $\dot{V}^A_0$, $\dot{V}_0$, and $\dot{I}_{oth}$ are proportional. Proved by equations (40) to (42).

(4) the constants of proportionality (1), (2), and (3) are fixed properties of the system and are each determined by the arrangement of conductors and the operating state of the inducting system.

DESCRIPTION OF THE PREFERRED EMBODIMENT

The present invention is based on the above characteristics (1) to (4), and an embodiment of the common suspension multi-line grounding protective relay of the present invention is explained with reference to FIGS. 2 to 5.

Figure 2A:
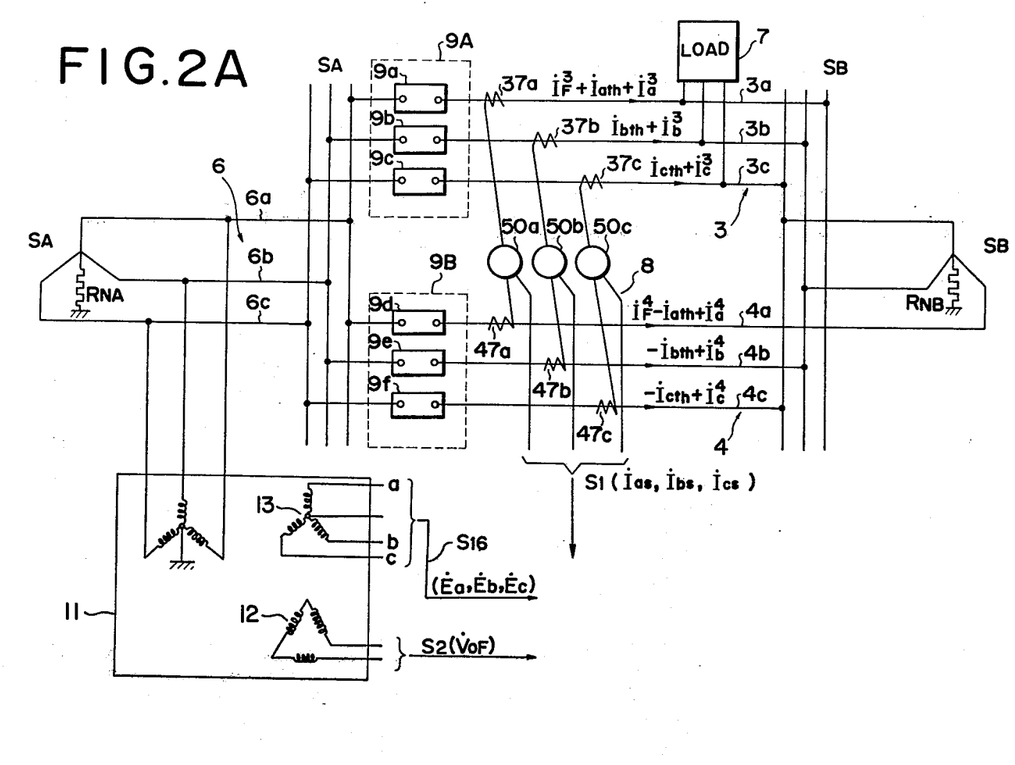
FIG. 2(A) shows an electric circuit diagram of a common suspension multi-line using a grounding protective relay according to the present invention.
Figure 2B:
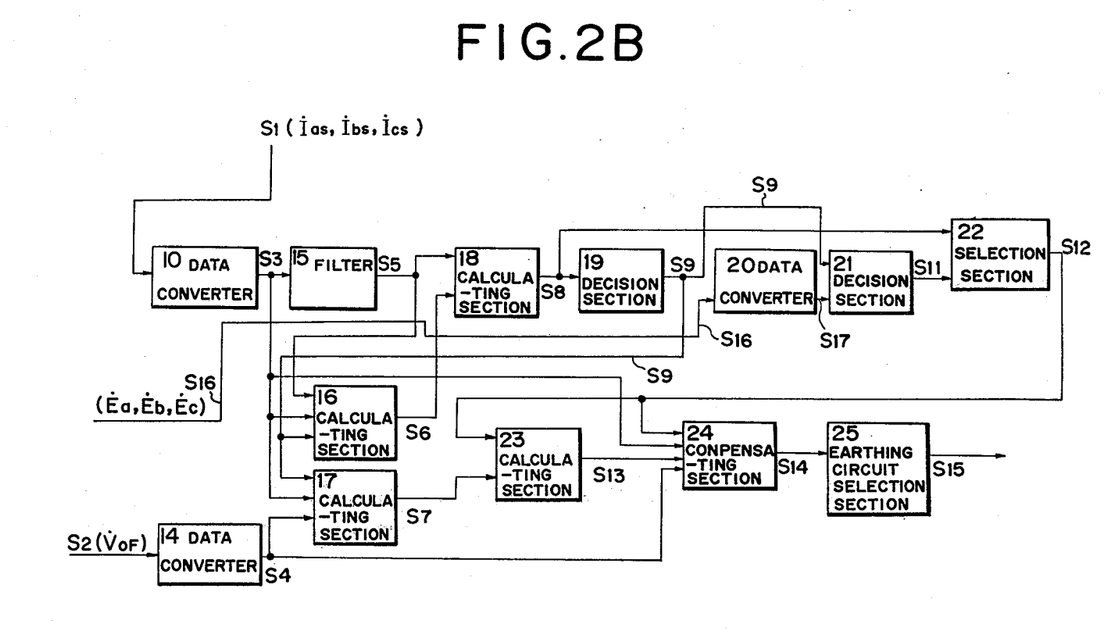
FIG. 2(B) shows a block diagram of a common suspension multi-line system grounding protective relay according to the present invention.

FIGS. 2A and 2B show a common suspension multi-line earthing protective relay according to this embodiment, and portions which are the same as portions of FIG. 1 are shown with the same reference numerals. In FIG. 2(A), there is shown a common suspension multi-line grounding protective relay according to the present invention. As shown in FIG. 2(A), a T-branch load 7 is connected to power transmission lines 3a to 3c of a third power transmission circuit. A current detector 8 is provided between the third power transmission circuit 3 and a fourth power transmission circuit 4. The current detector 8 comprises current transformers 37a to 37c which are connected to lines 3a to 3c respectively, current transformers 47a to 47c and current difference detectors 50a to 50c connected as a subtraction circuit to determine the differences in phases A, B, and C between the lines 3a, 3b, 3c and the lines 4a, 4b, and 4c. Circuit breaker sections 9A and 9B are provided in the third and fourth power transmission circuits. The circuit breaker section 9A consists of circuit breakers 9a to 9c connected as shown. The circuit breaker section 9B consists of circuit breakers 9d to 9f connected as shown.

The common suspension multi-line grounding protective relay comprises, substantially, elements numbered 10 to 25 in FIG. 2(B). In FIG. 2(B), the reference numeral 10 is a first data converter which samples at a fixed frequency the current $S_1$ from the current detecting section 8, in other words the inter-line differential currents $\dot{I}_{as}$, $\dot{I}_{bs}$, and $\dot{I}_{cs}$ and performs analog to digital conversion on them. 11 (FIG. 2A) is a voltage detecting section, and consists of, mounted on the buses 6a to 6c, a voltage transformer 12 for a zero phase voltage detector, and a voltage transformer 13 for phase voltage detectors. 12 is a first voltage detecting system, and 13 is a second voltage detecting system. 14 (FIG. 2B) is a second data converter which inputs the detected signal $S_2$ of the voltage transformer 12, in other words the zero phase voltage $\dot{V}_{oF}$, and in synchronism with the above mentioned first data converter 10 samples the zero phase voltage $\dot{V}_{oF}$ at a fixed frequency, and performs analog to digital conversion on it. 15 is a filter which inputs the digital values $S_3$, which are $\dot{I}_{as}$, $\dot{I}_{bs}$, and $\dot{I}_{cs}$, output by the first data converter 10, and calculates from the inter-line differential currents between each two phases, $\dot{I}_{as}-a\dot{I}_{bs}$, $\dot{I}_{bs}-a\dot{I}_{cs}$, and $\dot{I}_{cs}-a\dot{I}_{as}$ (where $a=ej \frac{2}{3}\pi$), thus eliminating the positive phase component. 16 is a first calculating section, which inputs the grounding fault detection signal $S_9$ from a first decision section 19, the output $S_3$ of the first data converter 10, and the output $S_5$ of the filter 5, and when first decision section 19 determines that the system is normal, performs at a sampling frequency or a sub-multiple of the sampling frequency the calculation of the ratio of the magnitudes and the phase differences between $\dot{R}_a$, $\dot{R}_b$, and $\dot{R}_c$ which are constants of each phase and are required to calculate the zero phase circulation current in the grounding fault, and then calculates $\dot{R}_a$, $\dot{R}_b$, $\dot{R}_c$. 17 is a third calculating section which inputs the output signal $S_9$ of the first decision section 19, the output $S_3$ of the first data converter 10, and the output $S_4$ of the second data converter 14, when the first decision section 19 determines that the system is normal, when an earthing fault occurs and performs calculation of the equation (66) described below to determine the zero phase voltage at the same sampling frequency or sub-multiple of the sampling frequency of the above mentioned first calculating section, and calculates the ratio of the sizes and the phase difference $\dot{K}^A_0$ of the zero phase voltage $S_3$ output by the above mentioned second data converter, and the zero phase component of the inter-line differential current $S_3$. 18 is a second calculating section which inputs the output $S_5$ of the above mentioned filter 15, and the constants $\dot{R}_a$, $\dot{R}_b$, and $\dot{R}_c$ of the below described equations (59), (62), and (64) necessary for derivation of the zero phase circulation currents when an earthing fault occurs and which are the output $S_6$ of the above mentioned first calculating section, and performs necessary calculation for derivation of the zero phase circulation currents when an earthing fault occurs. 19 is the first decision section and determines the existence of a grounding fault. 20 is a third data converter which converts the output of the second voltage detecting system 13 to a digital quantity, and outputs the digital quantity to the third decision section 21. 22 is a first selection section which inputs the output $S_8$ of the second calculation section 18, in other words, the calculation values for calculating the zero phase circulation currents in an earthing fault according to the phase which is earthed and the earthing phase detection signal $S_{11}$ from the second decision section, and: if phase a is earthed, calculating the zero phase circulation current from $\dot{R}_a$ and the inter-line differential currents for phases b and c; if phase b is earthed, calculating the zero phase circulation current from $\dot{R}_b$ and the inter-line differential currents for phases a and c; and if phase c is earthed, calculating the zero phase circulation current from $\dot{R}_c$ and the inter-line differential currents for phases a and b. 23 is a fourth calculating section, which inputs the zero phase circulation current, which is the output $S_{12}$ of the first selection section, and $\dot{K}^4{}_0$ which is the output $S_7$ of the third calculating section, and by performing a calculation of equation (67) described below, and corrects the zero phase circulation currents by using the ratio of sizes and phase difference $\dot{K}^4{}_0$, to find the zero phase vertical voltage $\dot{V}^4{}_0$ when grounding fault occurs. 24 is a first compensating section which inputs the output $S_3$ of the first data converter, the output $S_4$ of the second data converter, the output $S_{12}$ of the first selection section, and the output $S_{13}$ of the fourth calculating section, and compensates for the zero phase circulation current including the zero phase component of the inter-line differential current and the zero phase vertical voltage, including the zero phase voltage which is the output $S_4$ of the second data converter, using equations (74) and (75) described below. 25 is an earthing circuit selection section which inputs $S_{14}$, the zero phase component of the inter-line differential current and zero phase voltage, of which the zero phase circulation current and zero phase vertical voltage have been compensated for in the first compensating section, and selects the earthing circuit. $S_{15}$, the output of this earthing circuit selection circuit, is an earthing circuit trip signal, and by this signal the grounding circuit breakers 9A and 9B are tripped and the grounding protection of the transmission lines of the common suspension multi-line high resistance earthing system is performed.

In an earthing protection relay of the above construction, as one example, the distributions of the circulation currents $\dot{I}_{ath}$, $\dot{I}_{bth}$, and $\dot{I}_{cth}$, the a-phase grounding currents $\dot{I}^3{}_F$ and $\dot{I}^4{}_F$ and load currents $\dot{I}^3{}_a$, $\dot{I}^3{}_b$, $\dot{I}^3{}_c$, $\dot{I}^4{}_a$, $\dot{I}^4{}_b$, and $\dot{I}^4{}_c$ are shown.

Here, the circulation currents in each phase circulating from circuit 3 to circuit 4 are $I_{ath}$, $I_{bth}$, and $I_{cth}$, and the load currents flowing in each phase in circuit 3 and circuit 4 are respectively $\dot{I}^3{}_a$, $\dot{I}^3{}_b$, $\dot{I}^3{}_c$, $\dot{I}^4{}_a$, $\dot{I}^4{}_b$, and $\dot{I}^4{}_c$. The grounding current flowing in phase a in circuit 3 is $\dot{I}^3{}_F$; the grounding current flowing in phase a of circuit 4 is $\dot{I}^4{}_F$.

To explain the derivation of the zero phase circulation current $\dot{I}_{oth}$ when there is a grounding fault, a grounding protective relay according to the present invention is installed in power station $S_A$ in the common suspension system described below and shown in FIGS. 2A and 2B. In the case where the inducted system has a T-branch load 7, as shown in the figure, the load currents $\dot{I}^3{}_a$, $\dot{I}^3{}_b$, and $\dot{I}^3{}_c$ of circuit 3, and the load currents $\dot{I}^4{}_a$, $\dot{I}^4{}_b$, and $\dot{I}^4{}_c$ are not in equilibrium. In order to avoid the influence of the load currents and to measure only the circulation currents, if for example a-phase is earthed, from the inter-line differential currents $\dot{I}_{bs}$ and $\dot{I}_{cs}$ of phases b and c, by performing the following calculation, the positive phase component is eliminated:

$$\dot{I}_{bs} - a\dot{I}_{cs} \tag{43}$$

(where $a = e^{j\frac{2}{3}\pi}$)

A filter 15 performs the calculation of equation (43). Because in $\dot{I}_{bs}$ and $\dot{I}_{cs}$ no current is generated by earthing:

$$\dot{I}_{bs} = \dot{I}_b{}^3 - \dot{I}_b{}^4 + 2\dot{I}_{bth} \tag{44}$$

$$\dot{I}_{cs} = \dot{I}_c{}^3 - \dot{I}_c{}^4 + 2\dot{I}_{cth} \tag{45}$$

If we suppose that the load currents are in equilibrium, we have:

$$\dot{I}_b{}^3 = a\dot{I}_c{}^3 \tag{46}$$

$$\dot{I}_b{}^4 = a\dot{I}_c{}^4 \tag{47}$$

substituting equations (44) to (47) into equation (43):

$$\dot{I}_{bs} - a\dot{I}_{cs} = \dot{I}_b{}^3 - \dot{I}_b{}^4 + 2\dot{I}_{bth} - a(\dot{I}_c{}^3 - \dot{I}_c{}^4 + 2\dot{I}_{cth}) = \tag{48}$$

$$(\dot{I}_b{}^3 - a\dot{I}_c{}^3) - (\dot{I}_b{}^4 - a\dot{I}_c{}^4) + 2(\dot{I}_{bth} - a\dot{I}_{cth})$$

substituting the relational equation between equations (46) and (47) into equation (48), we have:

$$\dot{I}_{bs} - a\dot{I}_{cs} = 2(\dot{I}_{bth} - a\dot{I}_{cth}) \tag{49}$$

To reiterate the related equations for equations (23), (24), (25), and (30) of the first common suspension idealised system:

$$\dot{I}_{ath(o)} = \dot{K}_a \dot{I}_{(o)} \tag{50}$$

$$\dot{I}_{bth(o)} = \dot{K}_b \dot{I}_{(o)} \tag{51}$$

$$\dot{I}_{cth(o)} = \dot{K}_c \dot{I}_{(o)} \tag{52}$$

$$\dot{I}_{oth(o)} = \dot{K} \dot{I}_{(o)} \tag{53}$$

Figure 3:
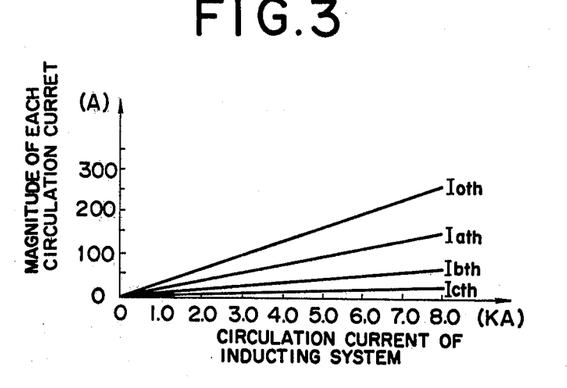
FIG. 3 shows the relations between the circulation currents found in the idealized system of FIG. 1 and the flow in the inducting system.
Figure 4:
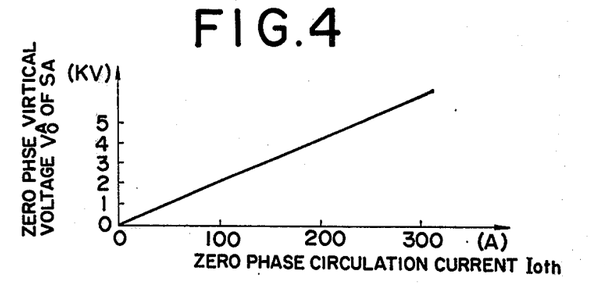
FIG. 4 shows the relation between the zero phase vertical voltage and the zero phase circulation current.

Here (o) shows a value for a normal operating time. A graphical representation of equations (50) to (53) for the common suspension idealised system of FIG. 1 is shown in FIG. 3.

Substituting equations (51) to (53) into equation (49):

$$\dot{I}_{bs(o)} - a\dot{I}_{cs(o)} = 2(\dot{I}_{bth(o)} - a\dot{I}_{cth(o)}) = 2(\dot{K}_b - a\dot{K}_c)\dot{I}_{(o)} \tag{54}$$

Here ' is used to indicate values when there is an a-phase earthing, and at this time, setting the current of the inducting system as $\dot{I}'$, and the zero phase circulation current as $\dot{I}'_{oth}$, from equation (53):

$$\dot{I}'_{oth} = \dot{K} \dot{I}' \tag{55}$$

Again, when phase a is earthed, equation (54) becomes:

$$\dot{I}'_{bs} - a\dot{I}'_{cs} = 2(\dot{K}_b - a\dot{K}_c)\dot{I} \tag{56}$$

Eliminating $\dot{I}(o)$ from equations (53) and (54), we have:

$$\dot{K} = \frac{\dot{I}_{oth}(o)}{\dot{I}(o)} = \frac{2(\dot{K}_b - a\dot{K}_c)}{\dot{I}_{bs}(o) - a\dot{I}_{cs}(o)} \cdot \dot{I}_{oth}(o) \tag{57}$$

Substituting equations (56) and (57) into equation (55), $\dot{I}'_{oth}$ can be obtained from:

$$\dot{I}_{oth} = \frac{2(\dot{K}_b - a\dot{K}_c)}{\dot{I}_{bs}(o) - a\dot{I}_{cs}(o)} \cdot \dot{I}_{oth}(o) \cdot \frac{\dot{I}'_{bs} - a\dot{I}'_{cs}}{2(\dot{K}_b - a\dot{K}_c)} \tag{58}$$

$$= \frac{\dot{I}_{oth}(o)}{\dot{I}_{bs}(o) - a\dot{I}_{cs}(o)} \cdot (\dot{I}'_{bs} - a\dot{I}'_{cs})$$

$\dot{I}_{oth}(o)$ on the right-hand side of equation (58) is equal to $\frac{1}{2}$ of the zero phase component of $\dot{I}_{as}(o)$, $\dot{I}_{bs}(o)$, and $\dot{I}_{cs}(o)$. Setting the first item of the right hand side of equation (58) to $\dot{R}_a$, we have:

$$\dot{R}_a = \frac{\dot{I}_{oth}(o)}{\dot{I}_{bs}(o) - a\dot{I}_{cs}(o)} = \frac{\dot{I}_{as}(o) + \dot{I}_{bs}(o) + \dot{I}_{cs}(o)}{2(\dot{I}_{bs}(o) - a\dot{I}_{cs}(o))} \tag{59}$$

Substituting equation (59) into equation (58):

$$\dot{I}'_{oth} = \dot{R}_a(\dot{I}'_{bs} - a\dot{I}'_{cs}) \tag{60}$$

As above, by first determining $\dot{R}_a$ shown in equation (59), when the system is normal, then when phase a is earthed, from the inter-line differential currents $\dot{I}'_{bs}$ and $\dot{I}'_{cs}$ of the normal phases, from equation (60), $\dot{I}'_{oth}$ can be determined.

In the same way, when phase b is earthed, from the inter-line differential currents $\dot{I}'_{as}$ and $\dot{I}'_{bs}$ of the normally operating phases, we have:

$$\dot{I}'_{oth} = \dot{R}_b(\dot{I}'_{cs} - a\dot{I}'_{as}) \tag{61}$$

where:

$$\dot{R}_b = \frac{\dot{I}_{as}(o) + \dot{I}_{bs}(o) + \dot{I}_{cs}(o)}{2(\dot{I}_{cs}(o) - a\dot{I}_{as}(o))} \tag{62}$$

From equation (61) $\dot{I}'_{oth}$ can be found. In the same way, when phase c is earthed, from the inter-line differential currents of the normally operating phases $\dot{I}'_{as}$ and $\dot{I}'_{bs}$:

$$\dot{I}'_{oth} = \dot{R}_c(\dot{I}'_{as} - a\dot{I}'_{bs}) \tag{63}$$

where:

$$\dot{R}_c = \frac{\dot{I}_{as}(o) + \dot{I}_{bs}(o) + \dot{I}_{cs}(o)}{2(\dot{I}_{as}(o) - a\dot{I}_{bs}(o))} \tag{64}$$

From equation (63) $\dot{I}'_{oth}$ can be found. The calculation of $\dot{R}_a$, $\dot{R}_b$, and $\dot{R}_c$ of equations (59), (62), and (64), is carried out by the first calculating section 16, and the calculation of equations (60), (61), and (63) is performed by the second calculating section 19. According to the phase which is earthed, the grounding circulation current is selected from the calculation values of equations (60), (61), and (63) by the first selection section. Next the derivation of the zero phase vertical voltage $V^A_0$ will be described. As shown by equations (40), (41), and (42), $V^A_0$ and $I_{oth}$ are proportional. In the common suspension idealised system of FIG. 1, equations (40) to (42) are shown graphically in FIG. 4. To write equation (40) again:

$$\dot{V}_0^A = \dot{K}_0^A \dot{I}_{oth} \tag{65}$$

If we let the values of $\dot{V}^A_O$ and $\dot{I}_{oth}$ when the inducted system is operating normally, be $\dot{V}^A_O(0)$ and $\dot{I}_{oth}(0)$ respectively, at this time $\dot{V}^A_O$ is equal to the measured value of the zero phase voltage $\dot{V}_{oF}$. Finding $\dot{K}^A_O$ from equation (65), we have:

$$\dot{K}_0^A = \frac{\dot{V}_0^A(o)}{\dot{I}_{oth}(o)} = \frac{2\dot{V}_{oF}(o)}{\dot{I}_{as}(o) + \dot{I}_{bs}(o) + \dot{I}_{cs}(o)} \tag{66}$$

If $\dot{I}'_{oth}$ is the zero phase circulation current derived by selecting the calculation results of equation (60), (61), or (63), according to the phase which is earthed, then when a grounding fault occurs, the zero phase vertical voltage $\dot{V}^{A'}_O$ is obtained from equation (65Z) as follows:

$$\dot{V}_0^{A'} = \dot{K}_0^A \dot{I}'_{oth} \tag{67}$$

The calculation of equation (66) is performed by the third calculating section 17, and the calculation of equation (67) is performed by the fourth calculating section 23.

Above, the derivation of $\dot{I}'_{oth}$ and $\dot{V}^{A'}_O$ when a grounding fault occurs, has been described. Next, taking the case where phase a is earthed as an example, the method of compensating for $\dot{I}'_{oth}$ and $\dot{V}^{A'}_O$ in the grounding circuit selection relay, will be described. When phase a is earthed, the interline differential currents $\dot{I}_{a's}$, $\dot{I}_{b's}$, and $\dot{I}_{c's}$ of phases a, b, and c, and the zero phase voltage $\dot{V}_{oF}$ are given, by referring to FIG. 2A by:

$$\dot{I}_{a's} = \dot{I}_{F1} - \dot{I}_{F2} + 2\dot{I}_{a'th} + \dot{I}_{a'3} - \dot{I}_{a'4} \tag{68}$$

$$\dot{I}'_{bs} = 2\dot{I}'_{bth} + \dot{I}_{b'3} - \dot{I}_{b'4} \tag{69}$$

$$\dot{I}_{c's} = 2\dot{I}'_{cth} + \dot{I}_{c'3} - \dot{I}_{c'4} \tag{70}$$

$$\dot{V}_{o'F} = \dot{V}_0^{A'} + \dot{V}_F \tag{71}$$

In equation (71), $\dot{V}_F$ shows the zero phase voltage generated by a grounding fault. Taking as the ordinary grounding circuit selection relay current input, the zero phase component $\dot{I}_o$ of the inter-line differential current, and as the voltage input, the zero phase voltage $\dot{V}_o$ of the measured quantity:

$$\dot{I}_o = \dot{I}_{a's} + \dot{I}_{b's} - \dot{I}_{c's}$$

$$= \dot{I}_{F1} - \dot{I}_{F2} + 2(\dot{I}_{a'th} + \dot{I}_{b'th} + \dot{I}_{c'th})$$

$$= \dot{I}_{F1} - \dot{I}_{F2} + 2\dot{I}_{o'th} \tag{72}$$

$$\dot{V}_o = \dot{V}_{o'F} = \dot{V}_o^A + \dot{V}_F \tag{73}$$

(Here ' represents a quantity when a grounding fault occurs)

As will be clear from equations (72) and (73), as well as the component $\dot{I}_{F1}-\dot{I}_{F2}$ of the current input $\dot{I}_o$, from the earthing, there is added twice the zero phase circulation current $2\dot{I}_{o'th}$; as well as the component $\dot{V}_F$ of the voltage input $\dot{V}_o$ from the grounding, there is added the zero phase vertical voltage $\dot{V}_oA'$. Because of these terms $2\dot{I}_{o'th}$ and $\dot{V}_oA'$, the grounding circuit selection relay can erroneously operate or erroneously fail to operate: thus it is necessary to compensate for these terms. When phase a is grounding, obtaining $\dot{I}_{o'th}$ from equation (60), and obtaining $\dot{V}_oA'$ from equation (67), these values are compensated for by the following equation:

$$\dot{I}_F = \dot{I}_o - 2\dot{I}_{o'th} = \dot{I}_{a's} + \dot{I}_{b's} + \dot{I}_{c's} - 2R_a(\dot{I}_{b's} - a\dot{I}_{c's}) \quad (74)$$

$$\dot{V}_F = \dot{V}_o - \dot{V}_oA' = \dot{V}_{o'F} - \dot{K}_oA \cdot \dot{R}_a(\dot{I}_{b's} - a\dot{I}_{c's}) \quad (75)$$

In equation (74), $\dot{I}_F$ is the grounding circuit selection relay input current, and in equation (75), $\dot{V}_F$ is the voltage input. Compensation for $\dot{I}_{o'th}$ and $\dot{V}_oA'$ from the calculation of equations (74) and (75), is performed by the first compensating section 24. The selection, according to $\dot{I}_F$ and $\dot{V}_F$ of the grounding circuit is performed by the grounding circuit selection section 25. Thus, according to signal $S_{15}$ from the grounding circuit selection section 25, in the circuit breaker section 9A and 9B, circuit breaker 9a, 9b, 9c, 9d, 9e, or 9f is tripped.

When the system is operating normally, the calculation results of equations (60), (61), and (63) are all equal to the zero phase circulation current, but when a grounding fault occurs, because a grounding current is generated in the phase which is earthed, the values of expressions (60), (61), and (63) are not equal. By comparing the calculation values of the expressions (60) and (61), in relation (76):

$$\dot{R}_a(\dot{I}_{b's} - a\dot{I}_{c's}) = \dot{R}_b(\dot{I}_{c's} - a\dot{I}_{a's}) \quad (76)$$

It is possible to detect a grounding fault. The two sides of relation (76) are calculated by the second calculating section 18, and the detection of a grounding fault, by testing whether relation (76) holds or not, is performed by the first decision section 19.

In order to select the calculation value of equation (60), (61), or (63), according to the phase which is earthed, and thus to derive the zero phase circulation current, it is necessary to determine the phase which is earthed.

A method of detecting the phase which is earthed from the voltages $\dot{E}_a$, $\dot{E}_b$, and $\dot{E}_c$ of phases a, b, and c is now described. $\dot{E}_a$, $\dot{E}_b$, and $\dot{E}_c$ are measured by the second voltage detecting section 12 of FIG. 2B. These are converted to digital quantities in the second data converter 14 of FIG. 2B, and input to the third decision section 20, and then a test is made as to which of the following relations hold:

$$II(II\dot{E}_b + \dot{E}_cII - II\dot{E}_aII)II > e \quad (77)$$

$$II(II\dot{E}_a + \dot{E}_cII - II\dot{E}_bII)II > e \quad (78)$$

$$II(II\dot{E}_b + \dot{E}_aII - II\dot{E}_cII)II > e \quad (79)$$

Where e is a sufficiently small positive constant, and II II indicates absolute value.

Figure 5:
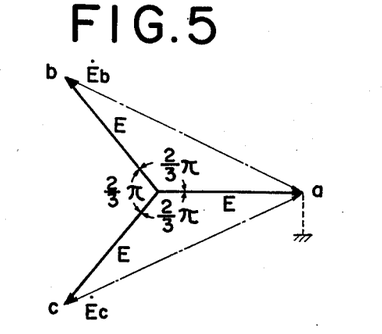
FIG. 5 is a vector diagram of the voltage for each phase when phase a is grounded.

In FIG. 5 a vector diagram of the voltage for each phase is shown by a dot dash line, for the case when phase a is earthed, and ignoring induction for a very high voltage transmission line. The solid lines show a vector diagram for normal operating conditions. If the magnitude of the voltage of each phase under normal operating conditions is taken as E, and phase a is taken as a base vector, when phase a is earthed, the voltages of each phase are found as follows:

$$\dot{E}_a = 0 \quad (80)$$

$$\dot{E}_b = \sqrt{3}\, E\, e^{j150°} \quad (81)$$

$$\dot{E}_c = \sqrt{3}\, E\, e^{-j150°} \quad (82)$$

Substituting equations (80), (81), and (82) into relations (77), (78), and (79), we get:

$$3E > e \quad (83)$$

$$0 > e \quad (84)$$

$$0 > e \quad (85)$$

After choosing a sufficiently small positive value for the constant e, relation (77) only will hold, and relations (78) and (79) will not hold.

In the same way, when phase b is earthed, relation (78) only will hold, and relations (77) and (79) will not hold. Again, when phase c is earthed, relation (79) only will hold, and relations (77) and (78) will not hold. Therefore, from which of relations (77) to (79) holds the earthed phase can be detected. Which of relations (77) to (79) hold for each phase being earthed, is shown in Table.

TABLE

| Earthed Phase | Relation | | |
|---|---|---|---|
| | (89) | (90) | (91) |
| a | Yes | No | No |
| b | No | Yes | No |
| c | No | No | Yes |

Status of relations (77), (78), and (79) for different earthed phases.

Yes: holds; No: does not hold.

Figure 6A:
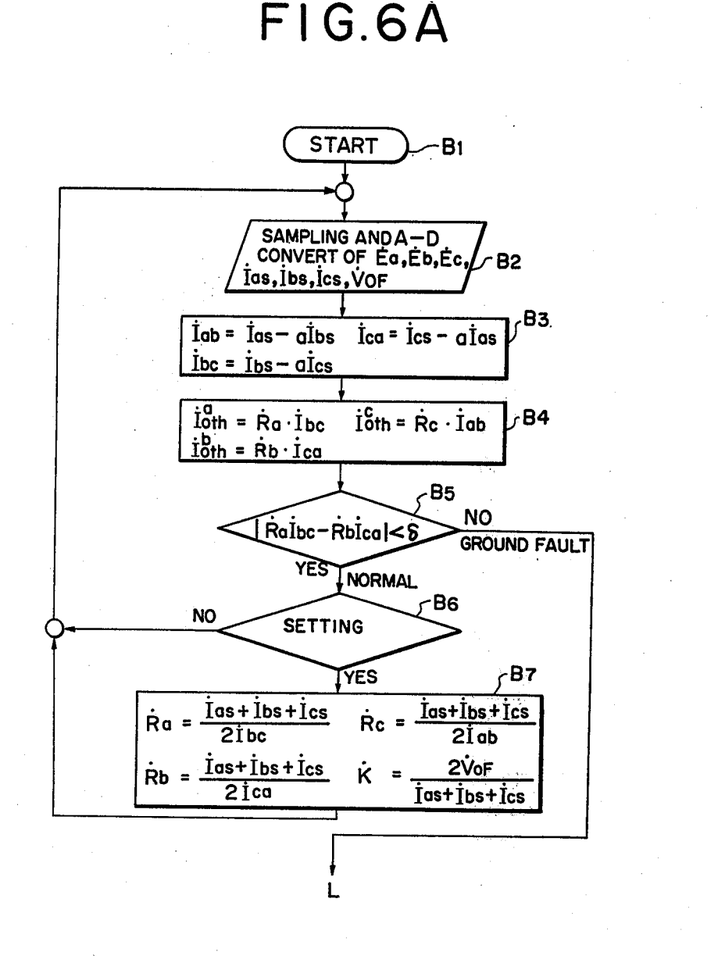
FIGS. 6(A) and 6(B) show a flow diagram of an implementation of the principle of the present invention using a microcomputer.
Figure 6B:
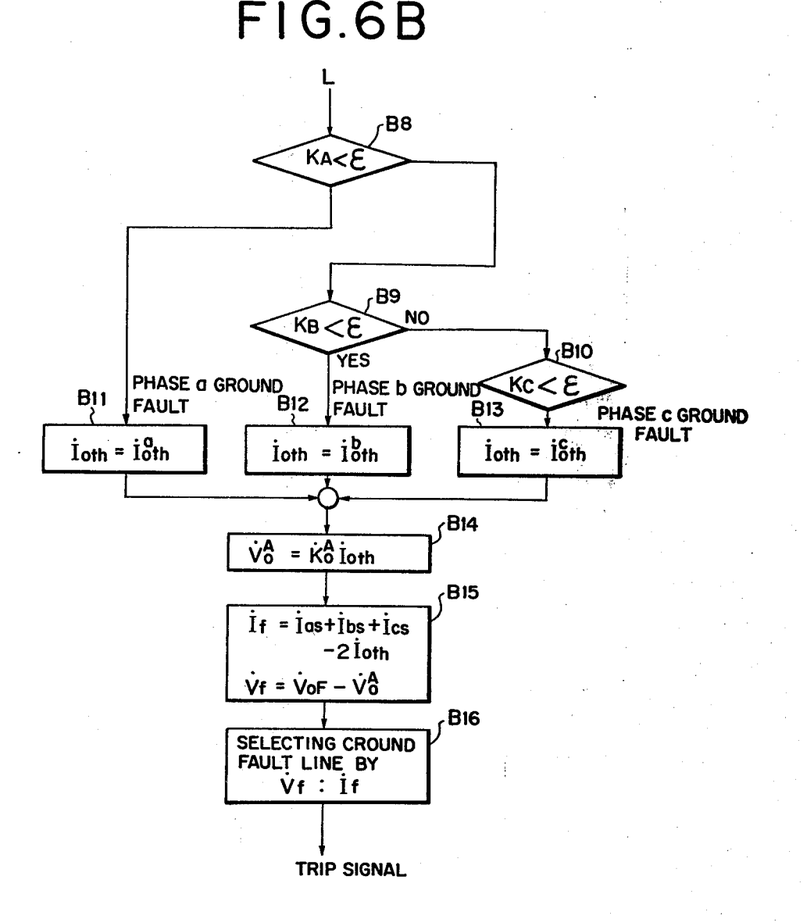

FIGS. 6A and 6B show an example flowchart of processing when the principle of the present invention is implemented by a microcomputer. Only the most important parts of the processing are shown; the initialising portion to calculate $\dot{R}_a$, $\dot{R}_b$, and $\dot{R}_c$ is omitted. In the example shown the earthed phase is detected from the inter-line differential currents. In FIG. 6 in block $B_2$ the voltage $\dot{E}_a$, $\dot{E}_b$, $\dot{E}_c$, the inter-line differential currents $\dot{I}_{as}$, $\dot{I}_{bs}$, and $\dot{I}_{cs}$ for phases a, b, and c, and the zero phase voltage $\dot{V}_{oF}$, which have been measured by current transformers and voltage transformers, are sampled at a fixed frequency, and analog to digital conversion is carried out. This corresponds to the first, second data converters.

In block $B_3$, by selecting the inter-line differential currents for two phases from the inter-line differential currents for all phases, $\dot{I}_{as}$, $\dot{I}_{bs}$, and $\dot{I}_{cs}$, the positive phase components are eliminated. When the positive phase component is eliminated from the inter-line differential current for phases a and b, or b and c, or c and a, the result is $\dot{I}_{ab}$, $\dot{I}_{bc}$, or $\dot{I}_{ca}$. This corresponds to the filter 16.

In block B$_4$, the above described expressions (60), (61) and (63) are calculated from $\dot{R}_a$, $\dot{R}_b$, and $\dot{R}_c$ found in block B$_7$ described below, and $\dot{I}_{ab}$, $\dot{I}_{bc}$, and $\dot{I}_{ca}$ found in block B$_3$. This corresponds to the second calculating section 18.

In block B$_5$, the calculation results of the above mentioned relations (60) and (61) found in block B$_4$ are substituted into the above mentioned relation (76); to write this relation in a different way:

$$I\dot{R}_a\dot{I}_{bc} - \dot{R}_b\dot{I}_{ca}I < d \quad (86)$$

Where II II indicates an absolute value.

If the right-hand side of the relation is smaller than the sufficiently small constant d, then if relation (86) is determined to hold, the system will be in the normal operating state. If this is not the case, then a grounding fault has occurred. This corresponds to the first decision section 19.

In block B$_5$, if a decision is made that the system is operating normally, in block B$_7$, at either the sampling frequency or a sub-multiple of the sampling frequency, the values $\dot{I}_{as}$, $\dot{I}_{bs}$, $\dot{I}_{cs}$, and $\dot{V}_{oF}$ which were converted to digital quantities in block B$_2$, are input, and the values $\dot{R}_a$, $\dot{R}_b$, $\dot{R}_c$, and $\dot{K}_oA$ of expressions (59), (62), (64), and (66) described above, are calculated. The frequency of calculation is determined by block B$_6$. Block B$_7$ corresponds to the first and third calculating sections 16 and 17. From block B$_7$ a return is made to block B$_2$, and the next measured values are sampled.

If in block B$_5$, it is determined that an earthing failure has occurred, the phase which has been earthed is determined in blocks B$_8$, B$_9$, and B$_{10}$. These blocks input the results of blocks B$_3$ and B$_4$; to express relations (77), (78), and (79) differently, we have:

$$\dot{K}_A = I((\dot{E}_b + \dot{E}_c) - \dot{E}_a)I > e \quad (87)$$

$$\dot{K}_B = I((\dot{E}_a + \dot{E}_c) - \dot{E}_b)I > e \quad (88)$$

$$\dot{K}_C = I((\dot{E}_a + \dot{E}_b) - \dot{E}_c)I > e \quad (89)$$

Here e is a sufficiently small constant. Relations (87) to (89) are calculated, and if relation (87) holds, then phase a is earthed, if relation (88) holds, then phase b is earthed, and if relation (89) holds, then phase c is earthed. Blocks B$_8$, B$_9$, and B$_{10}$ correspond to the third decision section 21.

Blocks B$_{11}$, B$_{12}$, and B$_{13}$ input the signals output by blocks B$_8$ to B$_{10}$ for each of phases a, b, and c to be earthed, and according to the phase which is earthed, selects the expression found in block B$_4$ for the zero phase circulation current $\dot{I}_{oth}$. The calculated expression used as the zero phase circulation current will be the aforesaid expression (60) if phase a is earthed, the aforesaid expression (61) if phase b is earthed, and the aforesaid expression (63) if phase c is earthed. These blocks correspond to the first selection section 22.

Block B$_{14}$ inputs the zero phase circulation current found in blocks B$_{11}$ to B$_{13}$, and $\dot{K}_oA$ found in block B$_7$, and calculating the above mentioned expression (67), derives the zero phase vertical voltage $\dot{V}_oA$. This corresponds to the fourth calculating section 23.

Block B$_{15}$ inputs $\dot{I}_{as}$, $\dot{I}_{bs}$, $\dot{I}_{cs}$, and $\dot{V}_{oF}$ which were converted to digital quantities in block B$_2$, the zero phase vertical voltage found in block B$_{14}$, and the zero phase circulation current derived in blocks B$_{11}$ to B$_{13}$, and using expressions (74) and (75), described above, corrects the zero phase circulation current and zero phase vertical voltage for the superimposed interline differential current zero phase component $\dot{I}_{as}+\dot{I}_{bs}+\dot{I}_{cs}$, and zero phase component $\dot{V}_{oF}$. This corresponds to the first compensating section. Block B$_{16}$ inputs the inter-line differential current zero phase component which was corrected for the zero phase circulation current in block B$_{15}$, and the zero phase voltage which was corrected for the zero phase vertical voltage in block B$_{15}$, and selecting the line which has been earthed, corresponding to the earthed line sends a circuit breaker trip signal. This corresponds to the earth circuit selection section 25.

Following the above explanation, the present invention makes use of the fact that the inter-line circulation currents $\dot{I}_{ath}$, $\dot{I}_{bth}$, and $\dot{I}_{cth}$ of phases a, b, and c of the inducted system, the zero phase circulation current $\dot{I}_{oth}$, and the zero phase vertical voltage $\dot{V}_oA$ are proportional to the flow in the inducting system; in other words, that the relation with $\dot{I}_{ath}$, $\dot{I}_{bth}$, $\dot{I}_{cth}$, $\dot{I}_{oth}$, and $\dot{V}_oA$ is one of fixed ratio proportionality irrespective of the magnitude and phase of the flow in the inducting system. Thus, first in the normal operating state, the constants $\dot{R}_a$, $\dot{R}_b$, $\dot{R}_c$, and $\dot{K}_oA$ are automatically adjusted, and using these constants, for each pair of phases after eliminating the positive phase component from the inter-line differential current, its magnitude and phase are corrected and the phase, which is earthed, is detected. When a grounding fault occurs, from the constants for the inter-line differential current of the normally operating phases, $\dot{R}_a$, $\dot{R}_b$, $\dot{R}_c$, and $\dot{K}_oA$, the zero phase circulation current, and zero phase vertical voltage are found and compensated.

Accordingly, in a common suspension multi-line system, according to the present invention, the effect of zero phase circulation currents and zero phase vertical voltages is made very small, and a grounding protective relay which can detect grounding accidents with high accuracy, can be obtained, with most efficacious results.

The present invention can be applied even to a transmission line in which a T-branch load of the form shown in FIG. 2A is not present, and it is also possible to apply the basic relation in which the filter is omitted and a=0 is assumed. Furthermore, although the inter-line differential current has been detected by a current detector, the method is also applicable to detect the current of each phase in both lines of the transmission lines by a current transformer, and convert to digital quantities, and thus perform the calculation.

Furthermore, the present invention is not only applicable to a common suspension system of a very high voltage system and a high resistance grounding system, but may also be applied to a common suspension system of two high resistance grounding systems, in order to provide grounding protection.

While the present invention has been described in terms of a preferred embodiment and a modification thereof, this is not to be taken as limitative of the present invention as many additions and modifications thereto will be apparent to those skilled in art but the invention is rather to be taken as defined by the appended claims.

What is claimed is:

1. A common suspension grounding protective relay, comprising:
    current detector means for detecting the currents in at least three phases of a high voltage parallel transmission lines and for outputting the inter-line differential currents between each two phases of said at least three phases;

filter means inputting said inter-line differential current between each two phases of a power transmission circuit from said current detector means and for eliminating from the inter-line differential current of said each pair of phases the positive phase component;

first calculating means for calculating the zero phase component from the inter-line differential currents detected by said current detector means and for calculating the ratio of the magnitudes and the phase difference between said zero phase component and the output of said filter means;

second calculating means for calculating the zero phase circulation current in a grounding fault by calculating the vector product of the output of said filter means and the ratio of the magnitudes and phase difference derived by said first calculating means;

grounded phase detector means for carrying out detection of the phase which is grounded;

first selection means for selecting a derivation result from said second calculating means according to the phase which is grounded; and zero phase current selection means for selecting the zero phase circulation current from said second calculating means by said first selection means.

2. A common suspension multi-line grounding protective relay as claimed in claim 1, further comprising a first detection means (19) for comparing quantities derived from said second calculating means (18), and a grounding accident of the power transmission line is detected by said first detection means.

3. A common suspension multi-line ground protective relay as claimed in claim 1, further comprising first voltage detector means for detecting the zero phase voltage of the transmission line, third calculating means for calculating the zero phase component of the zero phase voltage detected by said first voltage detector means and the zero phase component of the inter-line differential current detected by said current detector means and for calculating the ratio of the magnitudes and the phase difference of the zero phase voltage and the zero phase component of the inter-line differential current, and fourth calculating means for calculating the vector products of the derived zero phase circulation current in a grounding fault, the outputs of said third calculating means and the zero phase vertical voltage derived from said fourth calculating means.

4. A common suspension multi-line grounding protective relay as claimed in claim 3, wherein said first voltage detector means comprises a first voltage transformer for detecting the zero phase transmission bus of a high voltage transmission system.

5. A common suspension multi-line grounding relay as claimed in claim 3, further comprising data converting means including a first data converter which samples at a fixed frequency current from a current detecting means and performs analog to digital conversion on the inter-line differential currents, a second data converter inputting the zero phase voltage in synchronism with said first data converter samples said zero phase voltage, and a third data converter which converts the output second voltage detecting transformer and outputs the digital quantity to said third decision means.

6. A common suspension multi-line grounding protective relay as claimed in claim 5, including third calculating means comprises a third calculating section which inputs an output signal of a first decision section, the output signal of said first data converter, and the output signal of said second data converter, when the first decision section determines that the system is normal, to determines the zero phase voltage when an earthing fault occurs at the same sampling frequency or sub-multiple of the sampling frequency of the first calculating section.

7. A common suspension multi-line grounding protective relay as claimed in claim 6, wherein a fourth calculating means comprises a fourth calculating section which, inputs the zero phase circulation current which is the output signal of said first selection means, and the ratio of magnitudes and phase difference which is the output signal of said third calculating section to find the zero phase vertical voltage when grounded fault occurs.

8. A common suspension grounding protective relay as claimed in claim 1, further comprising second voltage detector means for detecting voltages $\dot{E}_a$, $\dot{E}_b$ and $\dot{E}_c$ of phases a, b, and c of the transmission lines, and third detection means (21) which inputs the voltages of phases a, b and c and detects the earthed phase of the transmission lines by determining which of the following relations (1), (2), (3) holds:

$$I(I\dot{E}_b + \dot{E}_cI - I\dot{E}_aI)I > e \quad (1)$$

$$I(I\dot{E}_a + \dot{E}_cI - I\dot{E}_bI)I > e \quad (2)$$

$$I(I\dot{E}_b + \dot{E}_cI - I\dot{E}_cI)I > e \quad (3)$$

(e=constant; II represents absolute value.) characterized in that an earthed phase of the transmission lines is detected in the third detection means.

9. A common suspension multi-line grounding protective relay as claimed in claim 1, further comprising compensating means for compensating the zero phase current and the zero phase vertical voltage, and earthing circuit selection means for selecting the zero phase component line of the output of said compensating means.

10. A common suspension multi-line grounding protective relay as claimed in claim 9, wherein said earthing circuit selection means comprises an earthing circuit selection section which inputs the output signal from said first compensating section, the zero phase component of the inter-line differential current and zero phase voltage, of which the zero phase circulation current and zero phase vertical voltage have been compensated for in the first compensating section, and selects the earthing circuit.

11. A common suspension multi-line grounding protective relay as claimed in claim 9, further comprising means for calculating the vector difference of the zero phase component of said differential current and the output of said first selection means (22) and the vector difference of the zero phase voltage ($V_{oF}$) from first voltage detector means (12) and the output of fourth calculating means (23).

12. A common suspension multi-line grounding protective relay as claimed in claim 9, wherein said compensating means comprises a first compensating section which inputs the output signal of a first data converter connected between said current detector and filter means, the output signal of second data converter, the output signal from the first selection means (9) and the output signal from a fourth calculating section, said second data converter inputting the zero phase voltage and said fourth calculating section inputs the zero phase circulation current which is the output of said first selection means.

13. A common suspension multi-line grounding relay as claimed in claim 1, further comprising data converting means including a first data converter (10) which samples at a fixed frequency the inter-line differential current from said current detecting means and performs analog to digital conversion, a second data converter inputting the zero phase voltage in synchronism with said first data converter (14) samples said zero phase voltage at a fixed frequency and performs analog to digital conversion the zero phase voltage, and a third data converter (20) which converts the output of the second voltage detecting means, and outputs the digital quantity to said grounded phase detector means.

14. A common suspension multi-line grounding protective relay as claimed in claim 13, comprising current detector means for detecting the currents of each phase in each three phases of a high voltage parallel transmission lines and for outputting the inter-line differential currents between each same phase of said three phases of each parallel transmission line said current detector means comprises three pairs of current transformers provided differentially to each other and three current difference detectors connected as a substraction circuit between each pair of current transformers of said three pairs of current transformers respectively.

15. A common suspension multi-line grounding protective relay as claimed in claim 14, comprising filter means inputting said inter-line differential current between each two phases of the power transmission circuit from said current detector means and for eliminating from the inter-line differential current of said each pair of phases and positive phase component, said filter means comprises a filter which inputs the digital values output by said first data converter.

16. A common suspension multi-line grounding protective relay as claimed in claim 15, comprising first calculating means inputting an output ($S_9$) of first detection means (19), the differential current between each same phase of the parallel transmission lines and an output ($S_5$) of said filter means (15) and for calculating the zero phase component of the inter-line differential currents detected by said current detector means when the system is ungrounded and for calculating the ratio of the magnitudes and the phase difference between said zero phase component and the output of said filter means, said first calculating means comprises a first calculating section inputting a grounding fault detection signal from said third detection means (19).

17. A common suspension multi-line grounding protective relay as claimed in claim 16, further comprising said second calculating means inputting the output ($S_5$) of said filter means (15) in which the positive component of each differential current between each two phases is eliminated and the output of said first calculating means, said second calculating means comprising a second calculating section for calculating the vector products of the vector quantity of the outputs ($S_6$) of said first calculating means (16) and the outputs ($S_5$) of said filter means (15).

18. A common suspension multi-line grounding protective relay as claimed in claim 17, wherein the phase, said grounded phase detector means comprises a third detection section which carries out detection of the phase which is grounded, and said first selection means comprises a first selection section which inputs the calculation values for calculating the zero phase circulation currents in a grounding fault according to the phase which is earthed.

19. A common suspension grounding protective relay high voltage parallel transmission lines with a power transmission circuit having plural phase current comprising:
current detector means for detecting the currents in at least three phases of the high voltage parallel transmission lines and for outputting the inter-line differential currents between each two phases of said at least three phases;
filter means (15) for inputting said inter-line differential current between each two phases of the power transmission circuit from said circuit detector means and for eliminating from the inter-line differential current of said each pair of phases the positive phase component;
first calculating means (16) for calculating the zero phase component from the inter-line differential currents detected by said current detector means and for calculating the ratio of the magnitudes and the phase difference between said zero phase component and the output of said filter means;
second calculating means for calculating the zero phase circulation current in grounding fault by filter means and the ratio of the magnitudes and phase difference derived by said first calculating means;
third detection means (21) for carrying out detection of the phase which is grounded;
first selection means (22) for selecting a derivation result from said second calculating means according to the phase which is grounded and for selecting the zero phase circulation current in a grounding fault.

* * * * *